United States Patent
Zimmer

(10) Patent No.: US 10,046,711 B2
(45) Date of Patent: Aug. 14, 2018

(54) DEVICE FOR LOADING TWO KAYAKS

(71) Applicant: Fred Zimmer, Port Ewen, NY (US)

(72) Inventor: Fred Zimmer, Port Ewen, NY (US)

( * ) Notice: Subject to any disclaimer, the term of this patent is extended or adjusted under 35 U.S.C. 154(b) by 82 days.

(21) Appl. No.: 15/338,409

(22) Filed: Oct. 30, 2016

(65) Prior Publication Data

US 2018/0118125 A1 May 3, 2018

Related U.S. Application Data

(63) Continuation-in-part of application No. 14/952,750, filed on Nov. 25, 2015, now Pat. No. 9,758,106.

(51) Int. Cl.
*B60R 9/04* (2006.01)
*B60R 9/042* (2006.01)
*B60R 9/08* (2006.01)
*B60P 1/54* (2006.01)
*B60P 3/10* (2006.01)

(52) U.S. Cl.
CPC ............ *B60R 9/042* (2013.01); *B60P 1/5419* (2013.01); *B60P 3/1008* (2013.01); *B60R 9/08* (2013.01)

(58) Field of Classification Search
CPC ..... B60P 1/5419; B60P 1/5442; B60P 3/1008; B60P 3/1025; B60R 9/042
USPC ........................... 212/180; 224/310; 414/543
See application file for complete search history.

(56) References Cited

U.S. PATENT DOCUMENTS

| 211,424 | A | * | 1/1879 | Pool | B60P 1/5442 |
| | | | | | 414/542 |
| 2,967,635 | A | * | 1/1961 | Barnett | B60P 3/1016 |
| | | | | | 414/462 |
| 3,215,294 | A | * | 11/1965 | Salamin | B60R 9/042 |
| | | | | | 224/310 |
| 3,360,144 | A | * | 12/1967 | D'Eestrube | B60P 3/1008 |
| | | | | | 414/462 |
| 3,608,759 | A | | 9/1971 | Spurgeon | |
| 3,615,030 | A | | 10/1971 | Wuest et al. | |
| 3,804,263 | A | * | 4/1974 | Castonguay | B60P 1/548 |
| | | | | | 212/180 |
| 3,927,779 | A | * | 12/1975 | Johnson | B60P 3/1025 |
| | | | | | 414/462 |
| 4,139,110 | A | | 2/1979 | Roberts | |
| 4,269,396 | A | * | 5/1981 | Easterwood | B66C 23/44 |
| | | | | | 212/177 |
| 4,700,851 | A | * | 10/1987 | Reeve | B66C 23/36 |
| | | | | | 212/175 |
| 4,850,295 | A | | 7/1989 | Weaver | |
| 5,460,472 | A | * | 10/1995 | Bamber | B60P 1/5419 |
| | | | | | 212/180 |

(Continued)

FOREIGN PATENT DOCUMENTS

WO    WO 2014178728 A1    11/2014

*Primary Examiner* — James Keenan
(74) *Attorney, Agent, or Firm* — Lawrence D. Cutter, Esq.

(57) ABSTRACT

An arrangement of five supporting elements together with appropriate T-connectors and a four-way connector are employed to provide a device for loading one or more watercraft onto the top of a vehicle. The device is employable with conventional roof rack and kayak cradling structures. The arrangement includes a rotatable mast and boom which may be swung from one side of the vehicle to the other so that hoisting capabilities are available on either side of the vehicle so that multiple watercraft may be easily loaded onto the vehicle with minimal effort by one person.

5 Claims, 7 Drawing Sheets

(56) References Cited

U.S. PATENT DOCUMENTS

| | | | | |
|---|---|---|---|---|
| 5,590,618 | A * | 1/1997 | Marshall | B63B 27/06 |
| | | | | 114/343 |
| 5,752,799 | A * | 5/1998 | Carey | B60P 1/5471 |
| | | | | 224/403 |
| 6,428,263 | B1 | 8/2002 | Schellens | |
| 6,634,529 | B2 * | 10/2003 | Choiniere | B60R 9/042 |
| | | | | 224/310 |
| 7,575,120 | B2 * | 8/2009 | Beatty | B66C 23/44 |
| | | | | 212/180 |
| 7,780,050 | B2 | 8/2010 | Tucker | |
| 8,167,180 | B2 | 5/2012 | Bogoslofski et al. | |
| 8,366,373 | B2 * | 2/2013 | Wood | B60P 3/12 |
| | | | | 212/175 |
| 8,733,604 | B2 | 5/2014 | Murray et al. | |
| 9,067,522 | B2 | 6/2015 | Laverack et al. | |
| 9,333,922 | B2 | 5/2016 | Laverack et al. | |
| 9,758,106 | B2 * | 9/2017 | Zimmer | B60R 9/042 |
| 2005/0112963 | A1 | 5/2005 | Lavorata et al. | |
| 2008/0035688 | A1 | 2/2008 | Malone | |
| 2013/0280020 | A1 * | 10/2013 | O'Brien | B66C 23/36 |
| | | | | 414/543 |

\* cited by examiner

DEVICE FOR LOADING TWO KAYAKS

CROSS-REFERENCE TO RELATED APPLICATIONS

This application is a continuation-in-part of the patent cited herein which contains subject matter related to the subject matter of the present application, both of which are owned by the same applicant, and is presented in Kayak Loading Device, application Ser. No. 14/952,750 filed on Nov. 25, 2015 and having a priority date from provisional patent application Ser. No. 62/246,636 filed on Oct. 27, 2015, said application having issued as U.S. Pat. No. 9,758,106 on Sep. 12, 2017.

The above referenced patent describes an apparatus for loading a single kayak or similar craft onto the roof of a vehicle; the present application describes an apparatus for loading two kayaks or similar craft onto the roof of a vehicle.

TECHNICAL FIELD

The present invention is generally directed to a device for loading two kayaks or similar object onto a vehicle. More particularly, the present invention is directed to a device which is employed in conjunction with well-known car roof-mount systems. The present invention is used with such systems to raise one or more kayaks from ground level to a height consistent with placement on/in the roof mount. The present invention may also be employed with roof rack systems comprising two bars/rods extending from one side window of a vehicle to another.

BACKGROUND OF THE INVENTION

The present invention is designed for use by kayakers and the users of small boats having weights and structures similar to those of a kayak. While kayaks are generally considered to be relatively lightweight in comparison to other boats, nonetheless, they are typically transported by means of roof racks on a vehicle. There are several brands of roof rack that are typically employed in the transport of kayaks, these include the following two widely used brands: Thule® and Yakima®. The roof racks provided by these manufacturers and by others for the purpose of transporting various objects typically include at least two support structures that extend from one side window of the vehicle to the opposite side window. These two support structures are typically disposed in a parallel relation so as to support a kayak on the roof of the vehicle. Naturally, the kayak is oriented so that its prow is pointing to the front of the vehicle and its stern is pointing to the rear of the vehicle. Clearly, this orientation may also be reversed Manufacturers supply basic roof racks and additional attachments for loading various objects on a vehicle. For example, the basic roof rack structure may include an attachment for holding one or more bicycles on the roof of the vehicle. Similarly, the basic roof rack structure may also include an extra cargo pod for holding suitcases, sporting equipment, and the like for long trips. Most relevantly for the present invention, however, the two cited manufacturers, and others, also supply attachable cradles for holding kayaks. In general, kayaks are affixed to vehicles in one of two positions: (1) flat or down; and (2) at an angle in a cradle. This latter positioning is particularly advantageous when it is desired to carry a number of kayaks on the same vehicle at the same time. It is this last cradling arrangement which is taken advantage of in a preferred embodiment of the present invention.

Cradling structures for holding kayaks on a roof rack are illustrated in US patent application number US 2014/0263503 published on Sep. 18, 2014 in the name of Laverack et al.

It is also known that it is possible to employ rods extending from the ends of the roof rack to the ground in a sloped configuration. Such a device is illustrated in FIG. 5, discussed more fully below, and may be used in conjunction with the present invention but is not part of the present invention.

Individuals who are older, disabled, suffer from muscle or joint weakness or who are afflicted with various illnesses may not always be in a condition to lift a kayak to the full height of a vehicle roof. This is particularly true if the vehicle is a van rather than a sedan. Such individuals may require, perhaps only from time to time, a convenient mechanism for moving the kayak from ground level to vehicle roof level; and, correspondingly, from the roof level back to the ground. Such a mechanism should be lightweight, easy to handle, easy to install. It is also convenient if the mechanism is easily foldable until it is needed.

Being a sport conducted around water, kayaking is an endeavor that is best accomplished with at least one other individual. As a consequence, kayakers typically travel in groups. This typically requires any given transport vehicle to be able to carry more than one kayak on its roof. While the parent application of the instant application dealt with the issue of raising a single kayak to the roof of a vehicle, the present invention is directed to a mechanism for loading two kayaks on the roof of the vehicle.

From the above, it is therefore seen that there exists a need in the art to overcome the deficiencies and limitations described herein and above.

SUMMARY OF THE INVENTION

The shortcomings of the prior art are overcome and additional advantages are provided through the use of a plurality of supports which are easily affixed to the cradles of a pair of kayak carriers. Two horizontal supports are attached to these cradles. A third horizontal support is affixed to the roof racks to which the kayak cradles are attached. A rotatable vertical support is attached to the third horizontal support in a manner which makes the vertical support rotatable. The vertical support includes an angled upper portion which extends outwardly from its top. To this angled upper support portion there is included a list mechanism which typically includes a pulley arrangement (block and tackle). The vertical support is further supported by a relatively short horizontal piece which extends between the horizontal supports which are attached to the cradles.

In preferred embodiments of the present invention, the short horizontal piece provides an axis about which the vertical support is rotated. This provides a mechanism for lowering the vertical support to a position substantially parallel to the roof of the vehicle. This position is designed to reduce drag at highway speeds, particularly when the vehicle is not loaded with watercraft.

It is also noted that the present invention is employable with ramp type devices that extend down from the kayak cradles to the ground at a slant. This ramp is typically implemented in the form of rods that hook over the kayak clamps in pairs and extend down to the ground to provide what is, in effect, a ramp on which the kayak is slid up and onto a cradle.

It is noted that, while the present application is principally directed to the loading and unloading of kayaks, it is also employable for the purpose of loading a canoe or other small watercraft. In point of fact, the present invention is employable to load any two watercraft such as two canoes, two kayaks or a canoe and kayak.

Accordingly, it is an object of the present invention to provide a mechanism for transporting two kayaks or similar objects.

It is another object of the present invention to provide a mechanism for easily lifting two kayaks onto the roof of a vehicle for transport, especially by one person.

It is a still further object of the present invention to enhance the experience of kayaking and related water sports for individuals having certain physical limitations.

It is yet another object of the present invention to provide a mechanism for lifting objects to the roof of a vehicle.

It is a still further object of the present invention to provide an apparatus which is easily connectable to standard kayak cradles.

It is still another object of the present invention to provide a portable structure for loading kayaks or similar object such as canoes.

Lastly, but not limited hereto, it is an even further object of the present invention to provide a kayak loading device which is constructible with light weight and easily available materials.

Additional features and advantages are realized through the techniques and materials of the present invention. Other embodiments and aspects of the invention are described in detail herein and are considered a part of the claimed invention.

The recitation herein of desirable objects which are met by various embodiments of the present invention is not meant to imply or suggest that any or all of these objects are present as essential features, either individually or collectively, in the most general embodiment of the present invention or in any of its more specific embodiments.

BRIEF DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

FIG. 3 is a front (or back) view of the invention illustrated in FIG. 2 more particularly illustrating its relationship with respect to conventional kayak cradles and the roof rack they are mounted on;

DETAILED DESCRIPTION

A very desirable aspect of the present invention is that it is usable with conventional rooftop devices used for carrying kayaks and small boats on the top of a vehicle. The conventional roof rack begins with a pair of horizontally aligned supports extending from one side of a vehicle to the other side. These supports are generally configured so as to be substantially parallel to one another. The horizontal roof rack supports are provided with cradles which are designed to support kayaks and or other small watercraft. Reference herein to a roof rack and cradle generically referred to these well-known kayak transport devices.

Figure 1:
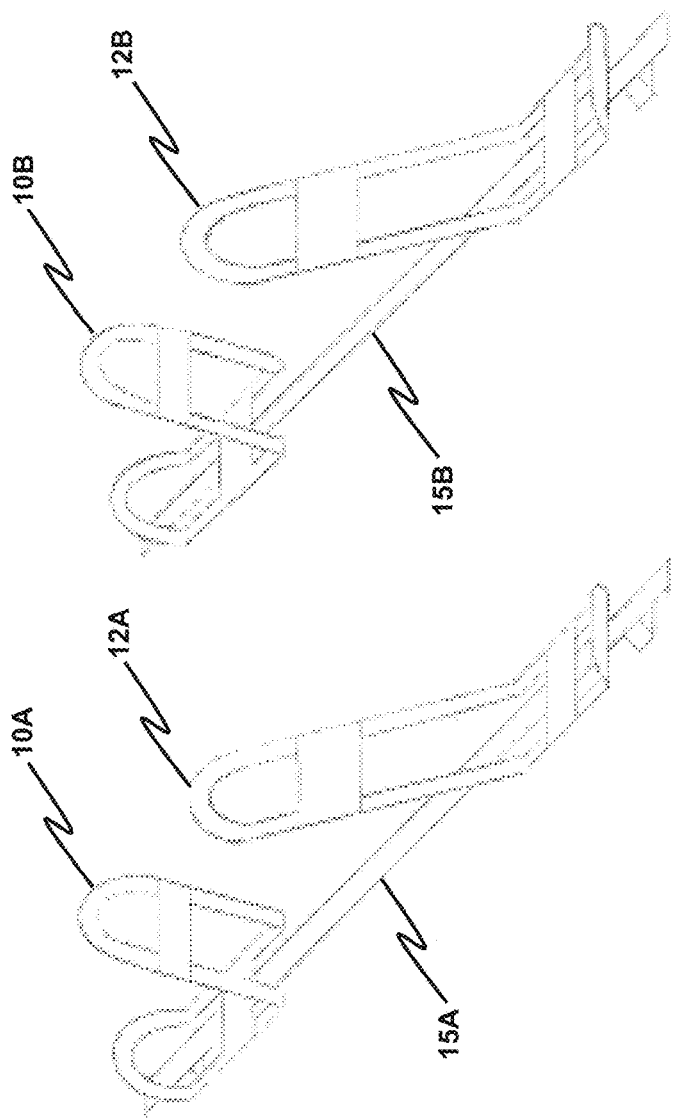
FIG. 1 is an isometric view illustrating a pair of conventional kayak cradles as they are positioned on the bars of a standard roof rack.

A configuration of these devices is shown in FIG. 1. Shown therein are roof rack support 15A (typically considered herein to be the roof rack support closest to the front of the vehicle) and roof rack support 15B, located closer to the rear of the vehicle. These supports are typically of metallic construction and are sized and structured to support one or more watercraft. Other materials for these supports may be employed.

Additionally shown in FIG. 1 are two pairs of cradles that are particularly suited for carrying kayaks. In particular, there is a first pair of cradles 10A and 10B positioned on what is assumed to be the right side or passenger side of the vehicle in question. These cradles typically hold a single kayak, however, cradles holding more than one kayak may be employed. It is noted, however, that the present invention is particularly designed for use with two kayaks. However, with the utilization of more involved cradling arrangements, the present invention may be employed to load more than two watercraft. In its most typical usage situation, the present invention is employed with a second pair of kayak cradles 12A and 12B, as shown in FIG. 1. The structures shown in FIG. 1 are conventional in nature. They are, however, the structures employed for anchoring the present loading invention.

The present invention is purposed for connection to the conventional roof rack structure and watercraft cradling situation encountered when two kayaks are to be loaded and/or unloaded from a vehicle. That is, the present invention is designed for easy connection to the structures shown in FIG. 1. The present invention includes a bottom or lower horizontal support 101 (FIG. 2) which is affixed to the two roof rack supports 15A and 15B shown in FIG. 1. Lower horizontal support 101 supports mask 104. Lower horizontal support 101 is provided with a T-connector 102 into which mast 104 is inserted. Mast 104 also includes a boom portion 104A.

The present invention also includes left horizontal support 110 and right horizontal support 114. These supports are affixed to upper portions of cradles 10 and 12 in FIG. 1. Left horizontal support 110 is also provided with T-connector 112 which is used in conjunction with horizontal support 108 to further support mast 104. Likewise, right horizontal support 114 is provided with T-connector 116 which is also used in conjunction with horizontal support 108. Mast 104 is provided with four-way connector 106. Horizontal support 108 is inserted into T-connector 116 and four-way connector 106 on one side of the mast and on the other side horizontal support 108 is inserted into both four-way connector 106 and to connector 112, as shown. As shown, and as implemented, support 108 comprises two separate pieces. However, with a different form for connector 106 it is possible for horizontal support 108 to comprise a single structure.

Connectors 102 and 106 serve an important function in that they permit rotation of mast 104 about a vertical axis. This allows boom 104A to be swung from the left to the right side of the vehicle or in the opposite direction. This permits loading a watercraft on one side of the vehicle after which boom 104A is swung around to the other side of the vehicle for loading an additional watercraft on the opposite side of the vehicle.

Figure 2:
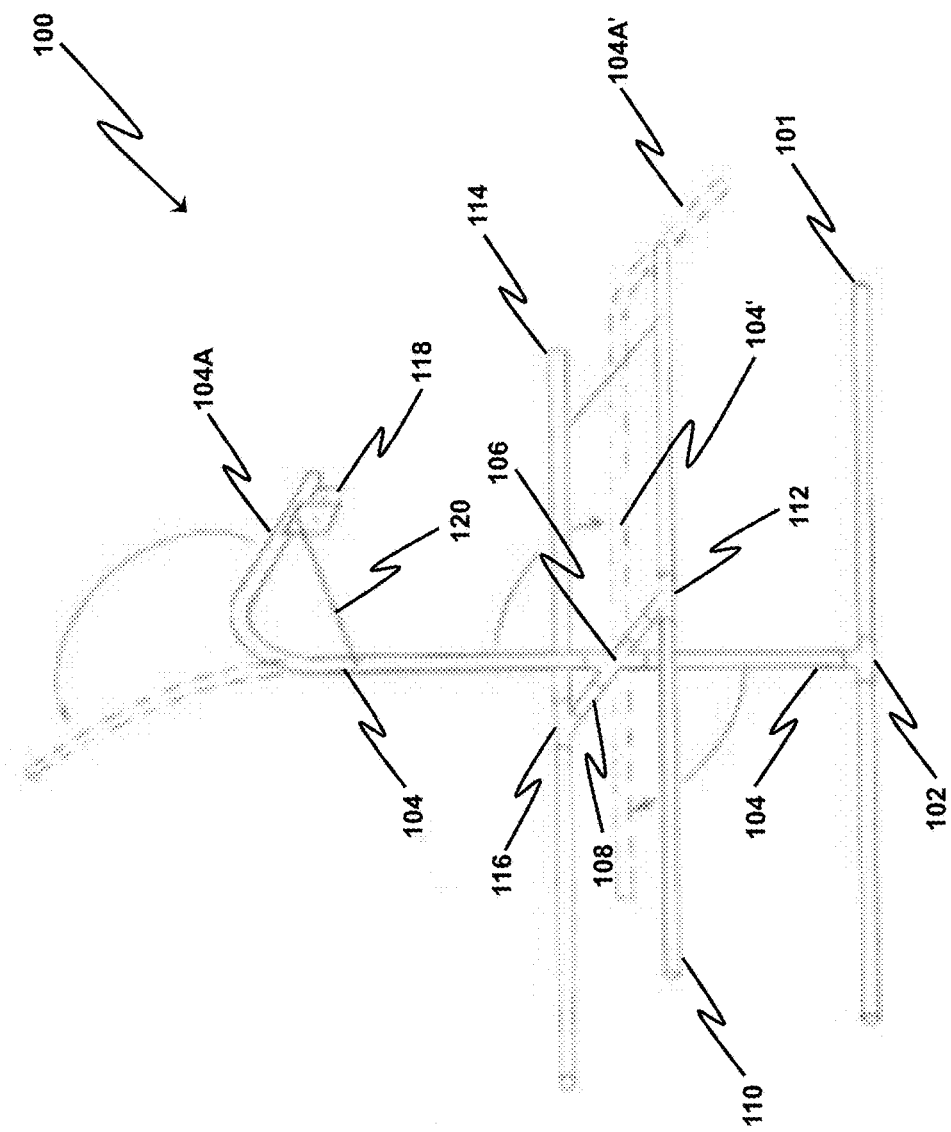
FIG. 2 is an isometric view illustrating the components of the present invention in an assembled configuration.

It is additionally noted that, for aerodynamic and other reasons mast 104 is rotatable about a horizontal axis which extends from one side of the vehicle to the other. This is accomplished by lifting mast 104 up and out of connector 102 and pivoting mast 104 about the aforementioned horizontal axis. In particular, it is noted that this horizontal axis is provided by horizontal support 108. It is additionally noted that FIG. 2 illustrates two phantom positions for mast 104. In one phantom position, boom 104A is seen swung to the right side of the vehicle. In another phantom position mast 104 is shown in a horizontal position 104A'.

Unless the material employed and the dimensions of mast 104 are of sufficient strength by themselves, it is generally preferable to provide mast 104 and boom 104A with brace 120. Brace 120 allows the utilization of materials for mast 104 that are more convenient and lighter in weight and smaller in size. Boom 104A also includes bracket 118 which is used to support a lifting device. In preferred embodiments of the present invention the lifting device is an arrangement of a rope and pulleys.

Left and right horizontal supports 114 and 110 are affixed to the upper portions of cradles 10 and 12 by any convenient means. These means include rope or cord, cinched nylon straps, elastomeric bands or radiator hose clamps. Additionally, it is noted that, for more permanent installations, holes may be drilled through horizontal supports 114 and 110 as well as through cradles 10 and 12. These holes may be fitted with any convenient fastening device including, but not limited to screws, bolts, rivets and/or clevis spins. Bottom horizontal support 101 is attached to the roof rack supports 15A and 15B in a similar manner.

The various components of the invention, as seen in FIG. 2 are not required to be made out of the same material. Typical materials employed for the present invention do include, however, both aluminum, steel and PVC piping. The material employed is typically selected based upon lightness and strength. However, material selection may also be controlled by availability and pricing of materials.

Figure 3:
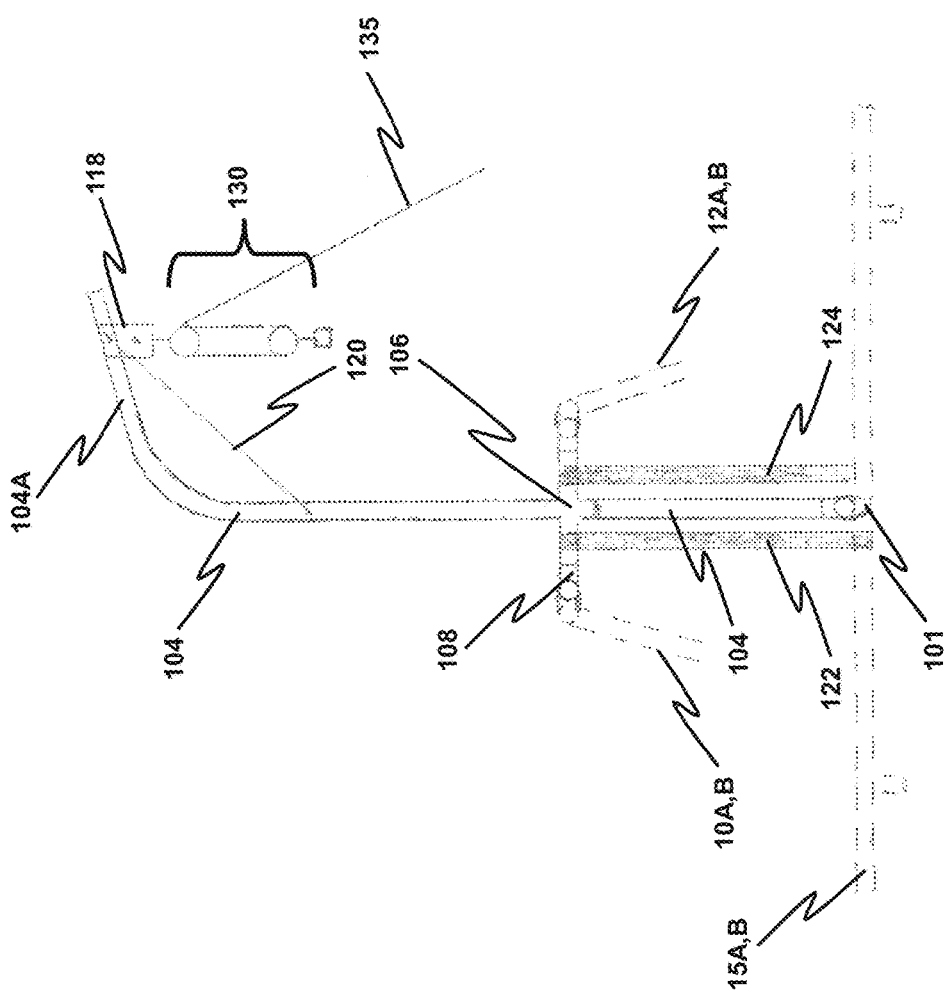

FIG. 3 illustrates the present invention as viewed from the front or rear of the vehicle. In particular, FIG. 3 illustrates the utilization of straps 122 and 124 which extends from horizontal support 108 to roof rack supports 15A and 15B. One extends from horizontal support 108 towards the front of the vehicle and the other extends towards the rear of the vehicle. These straps are provided for extra stability. They do not hinder rotation of the mast about horizontal support 108, used to rotate mast 104 into a horizontal position for travel.

FIG. 3 also illustrates the presence of a lifting mechanism 130 which preferably includes an arrangement of pulleys and rope used to hoist a watercraft from ground level to roof level. Lifting mechanism 130 is attached to boom 104A by means of bracket 118 positioned at the end of boom 104A. Rope 135 is used to hoist a watercraft into position.

Figure 4:
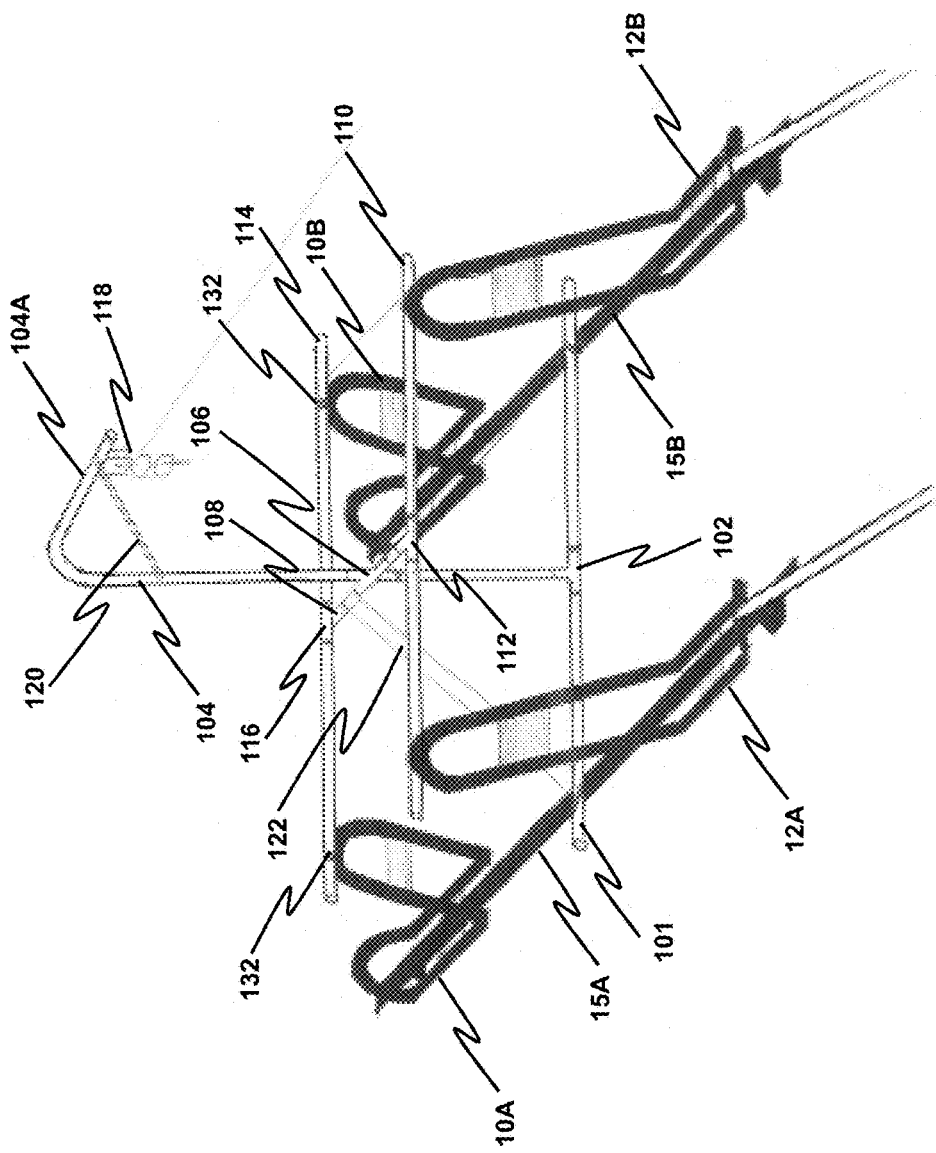
FIG. 4 is an isometric view of the present invention more particularly illustrating its relationship to the conventional kayak cradles and a roof rack.

FIG. 4 is an isometric view which combines the features of FIG. 2 with those of FIG. 1. Correspondingly numbered items are the same in all three figures. In particular, FIG. 4 is particularly illustrative of connection points 132 between left and right horizontal supports and the tops of cradles 10 and 12.

Figure 5:
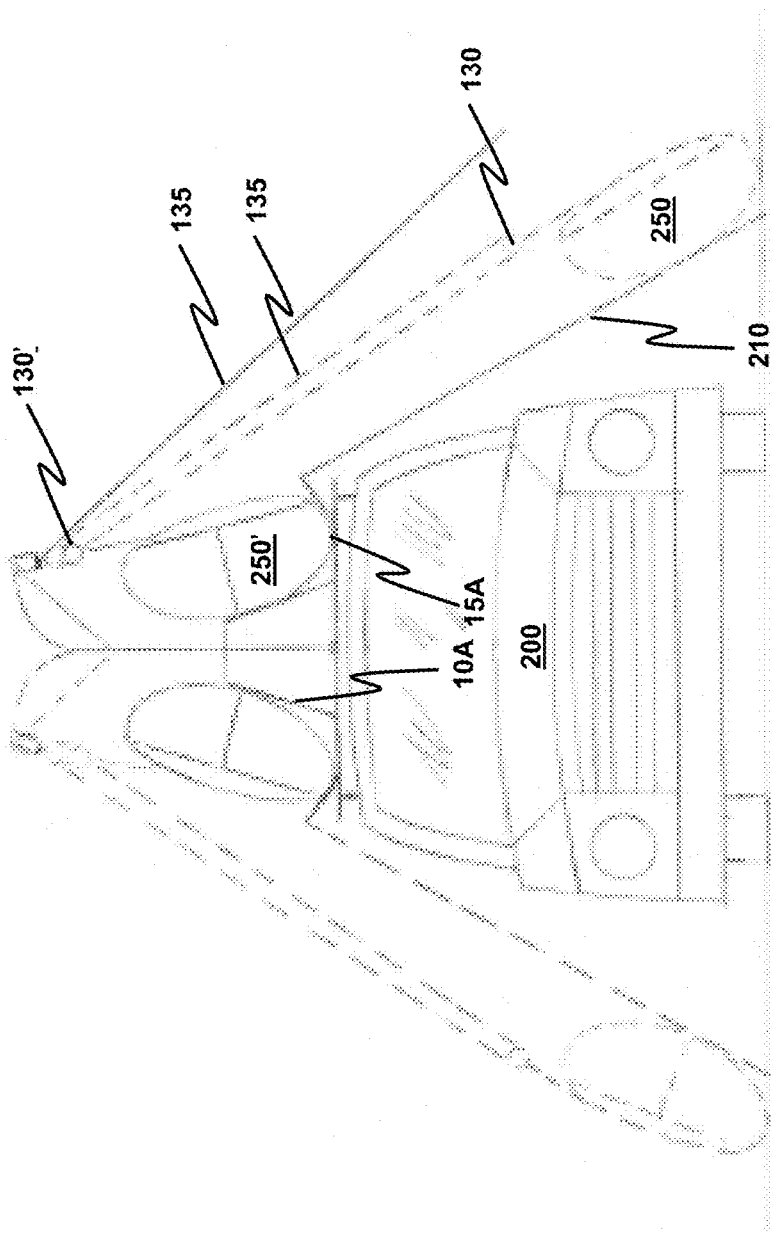
FIG. 5 is a front view illustrating the way in which the present invention is used to lift one or two kayaks (or similar objects) to the roof of a car.

FIG. 5 illustrates the practical use of the present invention in which a kayak 250 (phantom view position) is raised to roof rack position 250' by means of pulleys 130 and 130' and rope 135. While a rope and pulley arrangement is convenient and preferred in the present invention, it is noted that other lifting devices may also be employed such as the well-known ratcheting come-along or winch. The present invention is also usable in conjunction with ramp supports 210 which may comprise material similar to those employed in the present invention. Through the utilization of a pair of slant supports 210 extending from cradles 10 or 12 to the ground, lifting action of the present invention is made easier through the utilization of what is in effect an inclined plane. In fact such devices are preferably used in conjunction with the hoisting apparatus of the present invention. Vehicle 200 is seen supporting a conventional roof rack and cradling configuration such as that shown in FIG. 1.

Figure 6:
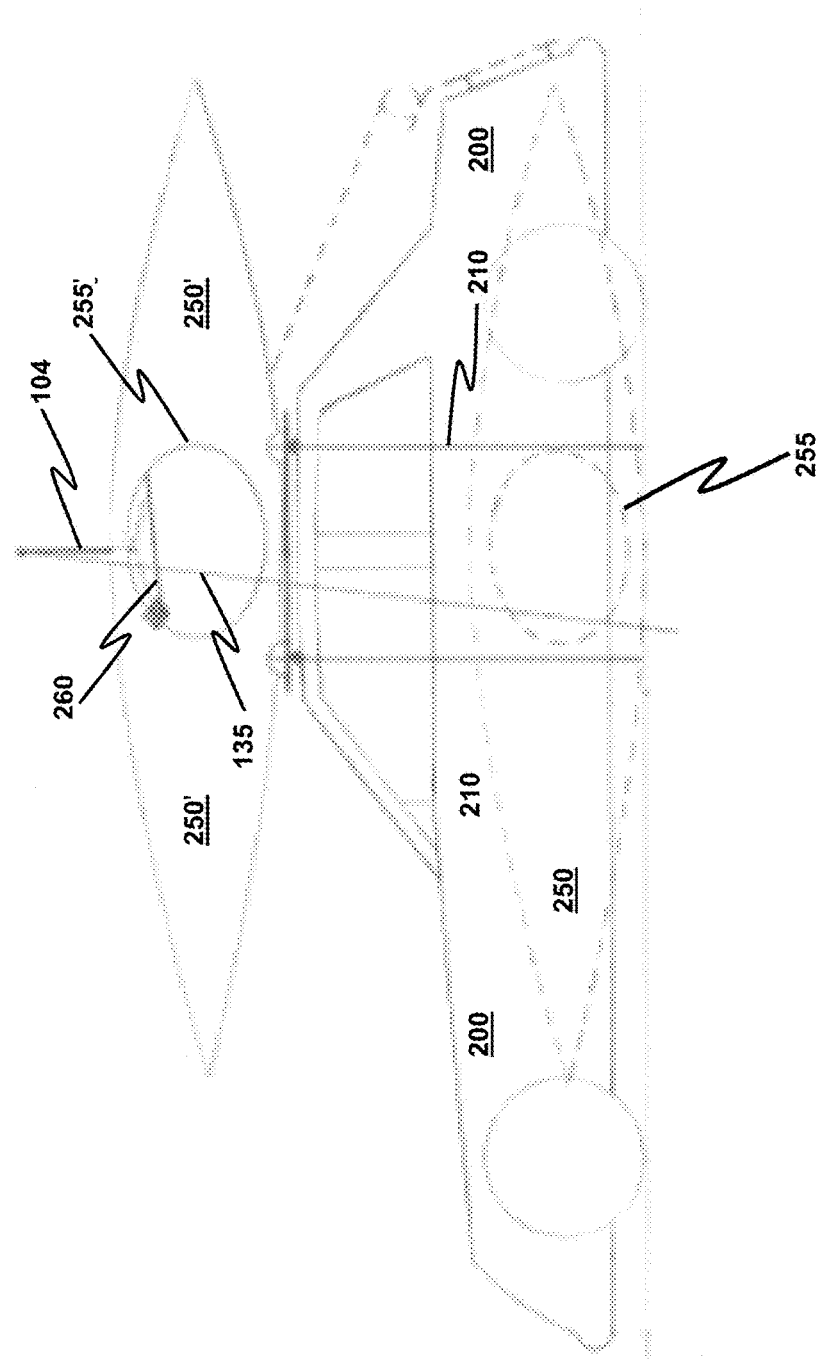
FIG. 6 is a side elevation view corresponding to the illustration in FIG. 5.

FIG. 6 is a view similar to FIG. 5 except that it is a view from the side of vehicle 200. However, FIG. 6 provides additional information with respect to providing a kayak with a desirable connection to a lifting device. In particular it is seen that FIG. 6 illustrates kayak 250 in its ground or lower position and further illustrates the presence in kayak 250 of cockpit opening 255. Likewise, FIG. 6 illustrates the position of the kayak in its roof mounted position 250' together with its corresponding cockpit opening 255'. Importantly, FIG. 6 also provides a pointer to mechanism 260 which is employed for attachment of kayak 250 to a lifting mechanism. This lifting mechanism is illustrated in FIG. 7.

Figure 7:
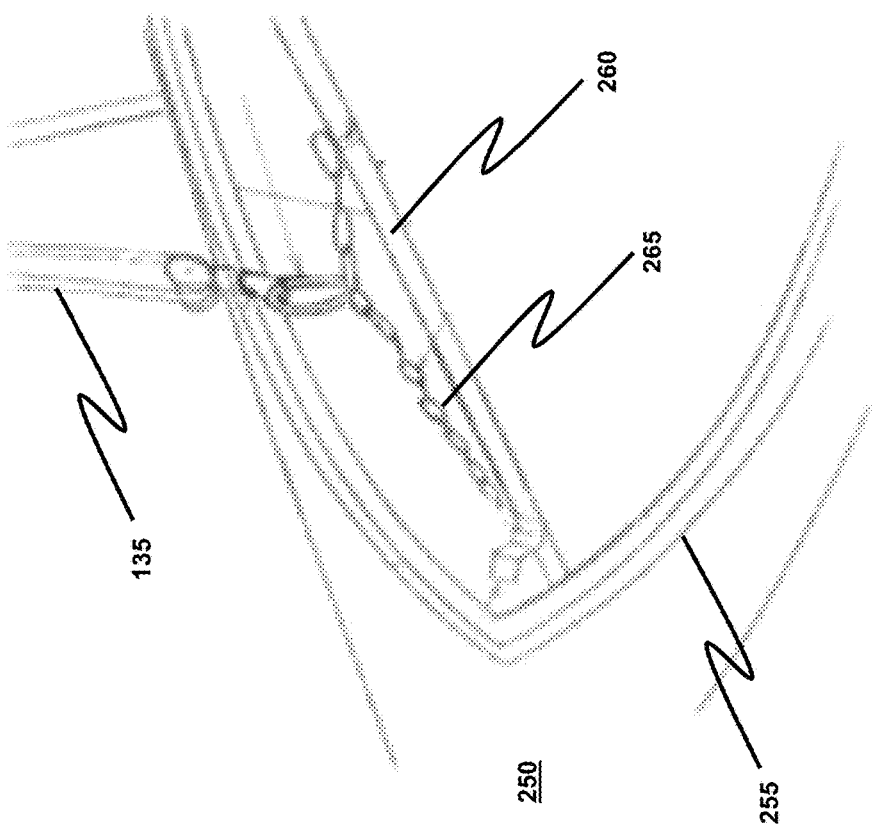
FIG. 7 is an isometric view illustrating a preferred apparatus and method for connecting a kayak to the lifting device employed in the present invention.

FIG. 7 illustrates a convenient mechanism for attaching a kayak to a lifting mechanism. In particular, rod 260 is configured to be at least as long as a portion of cockpit opening 255. Rod 260 has attached thereto a chain, rope or strap 265 to which a hoisting mechanism is attached. Positioning of rod 260 and flexible connection cord 265 provide a mechanism for properly balancing kayak 250 in order to most easily slide it upwards along ramp supports 210.

All publications and patent applications mentioned in this specification are indicative of the level of skill of those skilled in the art to which this invention pertains. All publications and patent applications are herein incorporated by reference to the same extent as if each individual publication or patent application was specifically and individually indicated to be incorporated by reference.

Although the description above contains many specifics, these should not be construed as limiting the scope of the invention, but as merely providing illustrations of some of the presently preferred embodiments of this invention. Thus, the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 USC § 112, sixth paragraph, unless the element is expressly recited using the phrase "means for."

While the invention has been described in detail herein in accordance with certain preferred embodiments thereof, many modifications and changes therein may be effected by those skilled in the art. Accordingly, it is intended by the appended claims to cover all such modifications and changes as fall within the spirit and scope of the invention.

What is claimed is:

1. A device for loading one or two kayaks onto a vehicle having a roof rack with at least two lateral supports extending from side window to side window of said vehicle and a pair of kayak cradles having vertically oriented supports extending upwardly from said lateral supports, said device comprising:
   a bottom horizontal support affixable to both of said lateral roof rack supports;
   a mast extending upwardly from said bottom horizontal support, said mast also having a generally horizontally extending boom, which is movable from one side of said vehicle to another side of said vehicle;
   a left horizontal support affixable to a first one of said pair of kayak cradles;
   a right horizontal support affixable to a second one of pair of said kayak cradles; and
   an upper horizontal support for said mast extending from said mast and affixed to said left and right horizontal supports.

2. The device of claim 1 in which said mast is adapted to be detached from said bottom horizontal support and is additionally rotatable about said upper horizontal support, said additional rotation having said upper horizontal support as an axis of rotation.

3. The device of claim 1 in which said device comprises material selected from the group consisting of aluminum, steel, PVC and wood.

4. The device of claim 1 further including a brace extending from said mast to said horizontally extending boom.

5. The device of claim 1 further including a lifting device attached to said horizontally extending boom.

* * * * *